United States Patent [19]

Mayer

[11] Patent Number: 4,526,396
[45] Date of Patent: Jul. 2, 1985

[54] LOCKABLE HITCH PIN

[76] Inventor: Robert Mayer, Rte. 1, Box 80, Plainview, Minn. 55964

[21] Appl. No.: 500,190

[22] Filed: Jun. 1, 1983

[51] Int. Cl.³ .............................................. B60D 1/02
[52] U.S. Cl. .................................... 280/515; 411/348
[58] Field of Search ........................ 280/515; 411/348

[56] References Cited

U.S. PATENT DOCUMENTS

| | | | |
|---|---|---|---|
| 2,077,825 | 4/1937 | Davidson | 280/515 |
| 2,180,558 | 11/1939 | Stasny | 172/364 |
| 2,367,874 | 1/1945 | Kelley | 280/515 |
| 2,430,143 | 11/1947 | Rutter | 280/515 |
| 2,436,210 | 2/1948 | Fuhrer et al. | 280/515 |
| 2,483,111 | 9/1949 | Spillman | 280/515 |
| 3,011,801 | 12/1961 | Neumann | 280/515 |
| 3,197,239 | 7/1965 | Jezek, Jr. | 280/515 |
| 3,865,407 | 2/1975 | Klassen | 280/515 |
| 4,087,112 | 5/1978 | Lee, Jr. | 280/515 |

FOREIGN PATENT DOCUMENTS

| | | | |
|---|---|---|---|
| 214049 | 3/1958 | Australia | 411/348 |
| 81832 | 1/1957 | Denmark | 280/515 |

*Primary Examiner*—Richard A. Bertsch
*Attorney, Agent, or Firm*—William J. Ryan

[57] ABSTRACT

A hitch pin comprising a cylindrical shaft portion, a head portion, a generally "C" shaped latch arm pivotally attached at one end to said head portion, said arm being rotatable between a closed position wherein the opposite end of said arm is positioned adjacent the bottom end of said shaft portion and an opened end wherein said other end has been swung away from the bottom of said shaft portion, and means positioned within said head portion for locking said arm in either of said opened position or said closed position, said means comprising a spring biased, spherical cam follower acting against a cam surface defined at the pivotal end of said arm and having a curved first portion and an outwardly extending, upwardly projecting planar second surface. The "C" shaped arms has means associated with it for remotely activicating said arm from a closed position to an opened position.

3 Claims, 3 Drawing Figures

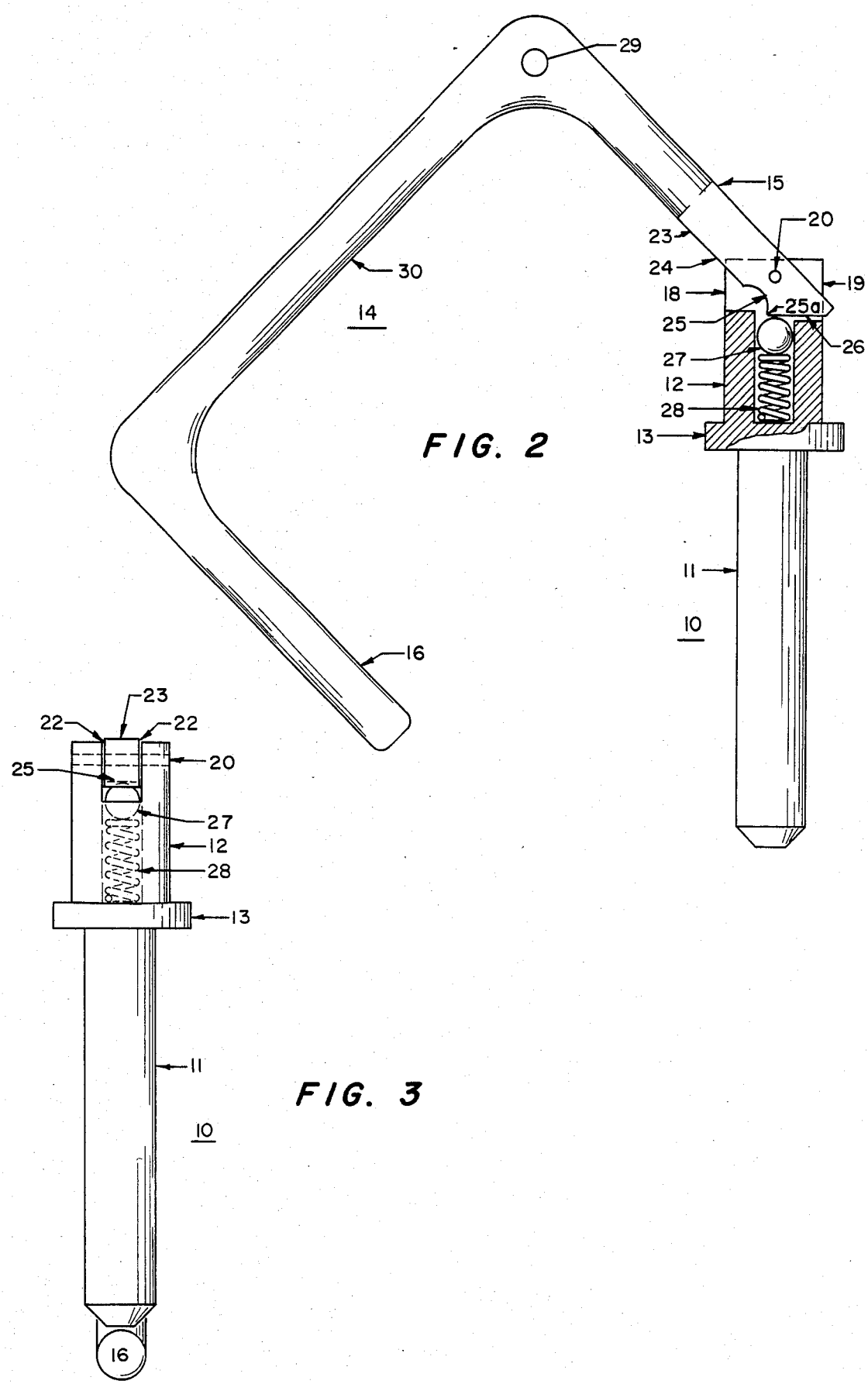

LOCKABLE HITCH PIN

SUMMARY OF THE INVENTION

The present invention relates to a hitch pin used to interconnect a towing vehicle, such as a farm tractor, with a towed vehicle, such as a wagon. Typically, a hitch plate is provided on the rear portion of a towing vehicle which is a generally flat bar structurally attached to the frame of the towing vehicle and having a vertical hole defined near its outward end. The towed vehicle is typically provided with a draw bar having a bifurcated yoke at its outer end, the forks of the yoke having aligned vertical holes near their outer ends. By positioning the vehicles such that the hitch plate of the towing vehicle is located between the forks of the draw bar of the towed vehicle, the vehicles may be operatively interconnected by inserting a hitch pin in the aligned holes.

Prior hitch pins generally have a cap or head portion of expanded diameter that prevents the pin from falling through the holes. It is also necessary to provide a means for preventing the pin from being dislodged from the holes due to upwardly exerted impulses or forces periodically applied to the pin because of the conditions under which such couplings are used. Such means have ranged from simple cotter pins inserted through the bottom end of the pin to pins having "C" or "U" shaped arms pivotally attached to the top of the hitch pin which can be swung down such that the distal end of the arm engages the bottom portion of the pin to prevent its removal from the hole. The devices of the prior art have a number of disadvantages. Most use means for limiting the upward vertical movement of the pin which require manual disengagement at the coupling. As an example, with most of the known devices, the tractor operator is required to dismount the tractor, walk around to the coupling and manually disengage the pin to uncouple the vehicles. Some of the known devices, particularly those having pivotable arms, for remotely disengageable and, therefore, do not require the operator to dismount the towing vehicle, but such devices are not easily or efficiently locked in place in a closed configuration and are likely to become disengaged at inconvenient times.

It is one object of the present invention to provide a hitch pin that is remotely disengagable by the operator of a towing vehicle without requiring that he dismount the vehicle.

It is another object of the present invention to provide a hitch pin operable between an opened position wherein the pin may be inserted in or withdrawn from the respective aligned holes of a towing vehicle's hitch plate and a towed vehicle's draw bar, and a closed position wherein the pin may be locked or secured in such position to operatively connect the towing vehicle to the towed vehicle.

It is a further object of my invention to provide a hitch pin having a "C" shaped arm pivotally attached to the top end of said pin, said arm being rotatable from a closed position wherein the distal end of said arm passes beneath the bottom end of said pin, and an opened position, wherein said distal end has been swung away from the bottom of the pin to allow its insertion into or removal from the aligned holes, the pin having means for locking the arm in either the opened position or the closed position.

BRIEF DESCRIPTION OF THE DRAWING

FIG. 2 is a sectional view of a hitch pin according to the present invention in an opened position.

FIG. 3 is a side elevational view of a hitch pin according to the present invention in a closed position showing internal components by a dashed line.

DETAILED DESCRIPTION OF THE PREFERRED EMBODIMENT

Figure 1:
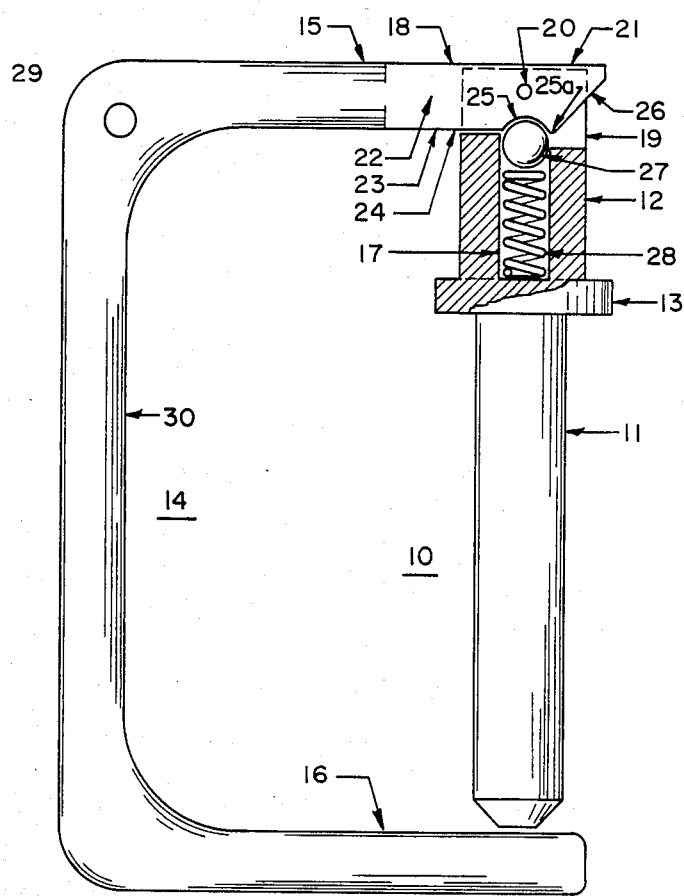
FIG. 1 is a sectional view of a hitch pin according to the present invention in a closed position.

Referring to the drawing wherein like numerals represent like elements throughout the several views, there is provided a hitch pin generally designated by the numeral 10. The hitch pin is designed for use in conjunction with the towing vehicle having a hitch plate with a hole through one end and a towed vehicle having a draw bar with a bifurcated yoke having aligned holes through the outer end of each fork. The hitch pin 10 operatively connects the towed vehicle to the towing vehicle when the respective holes are aligned and the hitch pin inserted therethrough.

The hitch pin 10 has a generally cylindrical, elongated shaft portion 11 and a generally cylindrical head portion 12 defining a shoulder 13 of expanded diameter with respect to the shaft portion 11. The shaft portion 11 is sized according to the amount of stress it is designed to withstand and must be of such a diameter as to be insertable through the holes of the hitch plate of the towing vehicle and the draw bar of the towed vehicle. For hitch pins used in conjunction with tractors and various farm vehicles and wagons, the shaft will typically have a diameter on the order of $\frac{3}{4}$ of an inch.

The shoulder 13 has a diameter greater than the shaft portion 11 and sufficient to act as a stop when the hitch pin 10 is inserted through the holes of the draw bar and hitch plate to prevent the hitch pin 10 from falling through the holes. Gravity will generally be sufficient to hold the hitch pin 10 in place while in operation. But in many instances, due to the uneven terrain or unexpected bumps and jars, upward forces are applied to the hitch pin 10 which tend to jar the pin 10 out of the holes and thereby uncouple the vehicles. To limit upward motion of the hitch pin 10 and thereby maintain the hitch pin 10 within the holes, a "C" shaped arm 14 is provided having a pivotal end 15, a central portion 30 and a distal end 16. The arm 14 is pivotally attached to the head portion 12 and is so sized that the distal end 16 will pass immediately beneath the end of the shaft 11 when the arm 14 is in the closed position, as best seen in FIG. 1.

The arm 14 is pivotally attached to the head portion 12 in such a fashion as to be manually operable between an opened position (shown in FIG. 2) and a closed position (shown in FIG. 1). It will be seen that when in the closed position the distal end 16 of the arm 14 passes immediately beneath the end of the shaft portion 11 and acts as a stop to limit the upward motion of the hitch pin 10 within the holes. When in the opened position, the distal end 16 of the arm 14 has been swung away from the end of the shaft 11 to permit the shaft 11 to be inserted into or withdrawn from the aligned holes to thereby couple or uncouple the vehicles, respectively.

Means are provided for semi-permanently locking or holding the arm 14 in either the opened position or the closed position. To this end, the head portion 12 has a longitudinally extending bore 17 defined along its axis and extending from the top of the head portion 12 inwardly toward the shoulder 13. Two oppositely disposed, longitudinally extending slots 18, 19 are also defined in the top of the head portion 12 in which the pivotal end 15 of the arm 14 is received and held in pivotal attachment to the head portion 12 by means of a pivot pin 20. The pivotal end 15 has a generally rectangular cross section defined by a top surface 21, two downwardly disposed side surfaces 22 and a bottom surface 23. The top surface 21 is generally planar and flat along its length. The side surfaces 22 are also generally planar and flat. The bottom surface 23 has a flat, planar interior portion 24 located distally of the pivot point and parallel to the plane of the top surface 21, a concave, upwardly curved central portion 25 positioned beneath the pivot point, and a flat, planar, upwardly disposed exterior portion 26, the plane of which converges on the plane of the top surface 21 so as to create a tapering exterior terminus of the pivotal end 15. The central portion 25 and exterior portion 26 meet at along a line designated 25a in the drawing.

Within the bore 17 is provided a sphere or ball 27 and a helical compression spring 28 positioned in such a fashion that the compression spring 28 acts against the closed or interior end of the bore 17 to urge the sphere 27 against the bottom surface 23 of the pivotal end 15. The sphere 27 is free to rotate within the bore 17 against the cam surface defined by the bottom surface 23. It will be seen, therefore, that the sphere 27 and bottom surface 23 cooperate to create a cam follower, cam relationship which serves to lock the arm 14 in either an opened or a closed position. The sphere 27 and the concave, central portion 25 of the bottom surface 23 are similarly sized so that the sphere 27 will fit snugly within the concave portion 25 but will be free to rotate therein. The first slot 18 has a depth approximately equal to the width of the side surfaces 22 along that portion adjoining the interior surface 24. The second slot 19 has a depth sufficient to permit the bottom of the slot 19 to act as a stop against the exterior terminus of the pivotal end 15 of the arm 14 being pivotted completely into the head portion 12, as best seen in FIG. 2.

In operation, it will be seen that the arm 14 is rotatably operable between an opened position shown in FIG. 2 wherein the pin 10 may be inserted or withdrawn from the aligned holes of the towing vehicle's hitch plate and the tongue of the towed vehicle, and a closed position shown in FIG. 1 wherein the distal end 16 of the arm 14 is positioned beneath the shaft portion 11 to prevent the withdrawal or dislodgment of the shaft portion 11 from the holes. The two distinct positions for the arm 14 are created by the particular configuration of the cam surface defined by the concave, central portion 25 and the exterior portion 26 of the bottom surface 23 along which the sphere 27 acts. The configuration described provides for an intermediate portion of the cam surface (the line 25a in the preferred embodiment) to be positioned at a greater distance from the pivot pin 20 than any other point along the cam surface upon which the cam (sphere 27) acts. Thus, the compression spring 28 acts to create two stable positions for the arm 14. When in the closed position the sphere 27 engages the concave portion 25 of the bottom surface 23. The tension in the spring 28 will serve to lock the arm 14 in that position since the arm 14, to be rotated to the opened position, will have to have a rotating pressure applied to it to compress the spring 28 to move the end point or line 25a of the bottom surface 23 past the sphere 27. The tension in the spring will also serve to hold the arm 14 in the opened position since an opposite rotating force will have to be applied to move the point 25a past the sphere 27 in the opposite direction.

Means are provided for enabling the operator of the towed vehicle to move the arm 14 to the opened position to uncouple the vehicles without dismounting the towed vehicle. To this end, means for attaching a rope or other actuating means are provided in conjunction with the arm. In the preferred embodiment, an eye 29 is provided near the top of the central portion 30 of the arm 14. By attaching a rope (not shown) or other actuating means to the eye, the operator can apply pressure in an upward direction to swing the arm 14 to the opened position and continued pressure will disengage the pin 10 from the holes.

It will be apparent to others that variations from the preferred embodiment described above will be possible within the scope of my invention.

What is claimed is:

1. A hitch pin comprising:
    A. A shaft portion;
    B. A head portion having a shoulder projecting outwardly of said shaft portion, said head portion having defined therein a longitudinally extending bore;
    C. A generally "C" shaped arm being pivotally attached to said head portion and having a pivotal end, a central portion, and a distal end, said arm being rotatable from a closed position wherein said distal end is positioned beneath the end of said shaft portion oppositely of said head portion, and an opened position wherein said distal end has been swung away from the bottom end of such shaft portion; said pivotal end of said arm defining a cam surface comprising a first, curved portion and a second, upwardly extending second portion immediately adjacent said first, curved portion;
    D. A compression spring located within the bore defined in said head portion; and
    E. A spherical cam follower positioned within said bore between said spring and said cam surface such that said spring acts to bias said cam follower against said cam surface.

2. A hitch pin comprising:
    A. A shaft portion;
    B. A head portion having a shoulder projecting outwardly of said shaft portion, said head portion having defined therein a longitudinally extending bore;
    C. A generally "C" shaped arm being pivotally attached to said head portion and having a pivotal end, a central portion, and a distal end, said arm being rotatable from a closed position wherein said distal end is positioned beneath the end of said shaft portion oppositely of said head portion, and an opened position wherein said distal end has been swung away from the bottom end of such shaft portion; said pivotal end defining a cam surface having a first, curved portion and a second portion intersecting said first portion at a line parallel to the axis of rotation of said arm, said line being positioned at a greater radial distance from the axis of rotation of said arm than any other points along said cam surface;
    D. A compression spring located within the bore defined in said head portion; and E. A cam follower positioned within said bore between said spring and said cam surface such that said spring acts to bias said cam follower against said cam surface.

3. A hitch pin comprising:
A. A cylindrical, elongated shaft portion;
B. A head portion having a shoulder projecting outwardly of said shaft portion, said head portion having defined therein a central, longitudinally extending bore;
C. A generally "C" shaped arm being pivotally attached to said head portion and having a pivotal end, a central portion and a distal end, said arm being rotatable from a closed position wherein said distal end is positioned beneath the end of said shaft portion oppositely of said head portion, and an opened position wherein said distal end has been swung away from said bottom end of such shaft portion; the pivotal end of said arm defining a cam surface having a curved portion and an outwardly extending, upwardly projecting generally flat portion;
D. A helical compression spring located within the bore defined in said head portion;
E. A spherical cam follower positioned within said bore between said compression spring and said cam surface such that said spring acts to bias said cam follower against said cam surface; and
F. Means associated with said arm for remotely activating said arm from the closed position to the opened position.

* * * * *